United States Patent [19]

Hoopes et al.

[11] 4,115,785
[45] Sep. 19, 1978

[54] OPEN CIRCUIT DETECTOR FOR MULTIPOINT RECORDER

[75] Inventors: Howard Sherman Hoopes, Hatfield; Robert William McClenahan, Philadelphia; Thomas Joseph Walsh, Hatboro; James William Zecca, Telford, all of Pa.

[73] Assignee: Leeds & Northrup Company, North Wales, Pa.

[21] Appl. No.: 824,150

[22] Filed: Aug. 12, 1977

[51] Int. Cl.$^2$ .............................................. G01D 9/34
[52] U.S. Cl. .................................... 346/34; 318/563; 340/187
[58] Field of Search ......................... 346/34; 340/187; 318/563

[56] References Cited

U.S. PATENT DOCUMENTS 2,808,549 10/1957 Vandeventer ...................... 318/563

Primary Examiner—Joseph W. Hartary
Attorney, Agent, or Firm—William G. Miller, Jr.; Raymond F. MacKay

[57] ABSTRACT

A string of short pulses is impressed across the input circuit of a multipoint recorder and a pulse magnitude detecting circuit. If the input circuit is open, the magnitude of the pulses appearing at the pulse magnitude detecting circuit is higher than would be the case if the input circuit were completed by a normal input device. The pulse magnitude detecting circuit is operable to apply to the measuring circuit of the multipoint recorder a positive potential whenever the pulse detecting circuit detects pulses of a magnitude indicating that the input circuit is open. As a result, the multipoint recorder is driven upscale to its limit where the particular point which is open-circuited is identified by a printed indicia.

4 Claims, 2 Drawing Figures

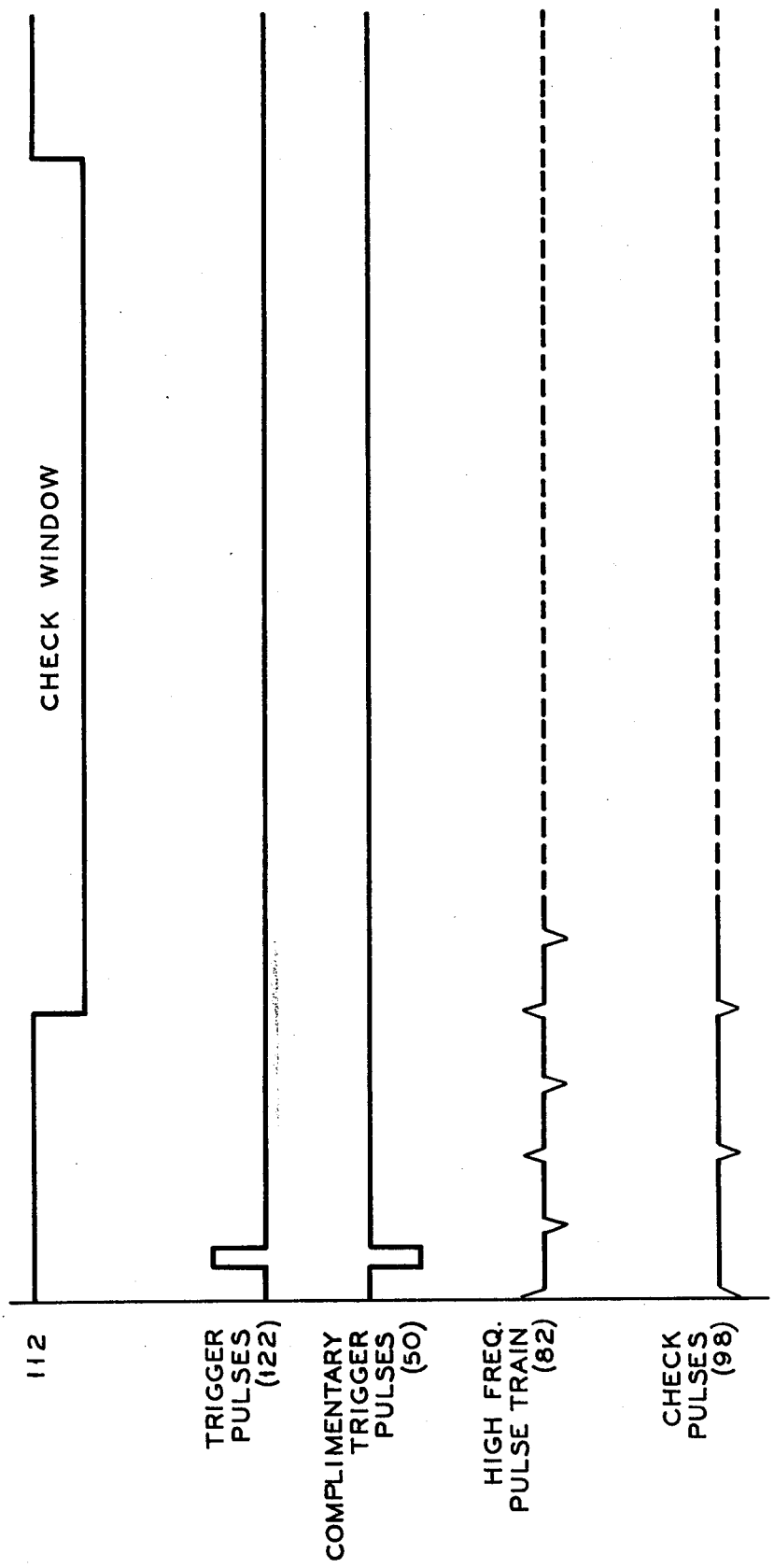

OPEN CIRCUIT DETECTOR FOR MULTIPOINT RECORDER

BACKGROUND OF THE INVENTION

This invention relates to circuit detecting apparatus for detecting open input circuits in multipoint recording systems having a plurality of input circuits which are sequentially switched to connect to a servo-operated measuring circuit through a low pass input filter.

Heretofore a wide variety of open-circuit detecting methods have been utilized to detect open circuits in the inputs of various recording devices. They have been used particularly when the input circuits include thermocouples for temperature measuring purposes. The open-circuit detecting methods previously used have been of the type which required either an excessive number of components and/or an excessive amount of time to make the checking operation. In addition, prior art testing circuits frequently include testing methods which tend to saturate the amplifier of the servo control for the measuring circuit during the time between points when the input circuits are open. The effect of such saturation, of course, is adverse to any system in which rapid checking of consecutive points is required.

The novel apparatus of this invention is not of the type which requires a shorting or disconnecting of the input filter in order to prevent such problems. Likewise, parallel devices are not inadvertently affected by the check signal as is the case with some checking methods and similarly, noise within the instrument will not disturb the measurement or cause spiking in the apparatus of this invention.

SUMMARY OF THE INVENTION

In carrying out this invention there is provided an apparatus for detecting an open input circuit in a multipoint recording system having a plurality of input circuits which are sequentially switched to connect to a servo-operated measuring circuit through a low-pass input filter. The apparatus includes a pulse generator for generating a train of short pulses. The pulse generating source is connected to the same a.c. power source that causes the input switching so that the pulses are phased to occur only when one of the inputs is connected to the measuring circuit. A clipping circuit provides a limited amplitude square wave from the power source. Means is also provided for differentiating the square wave to produce the train of short pulses. Also, included in the apparatus are means for connecting the pulse source across the inputs as they are connected to the measuring circuit and also across a pulse magnitude detecting means operable to produce an output when the potential across the input of the detecting means increases due to an open circuiting of the connected input. There is also provided means for producing a signal to the measuring system which will cause it to run to a limit when an open circuit is detected.

BRIEF DESCRIPTION OF THE DRAWINGS

In the drawing in which like elements have like reference characters,

FIG. 2 is a graphical representation of the wave forms of the pulses appearing on several lines of the circuit of FIG. 1.

DESCRIPTION OF THE PREFERRED EMBODIMENT

Figure 1:
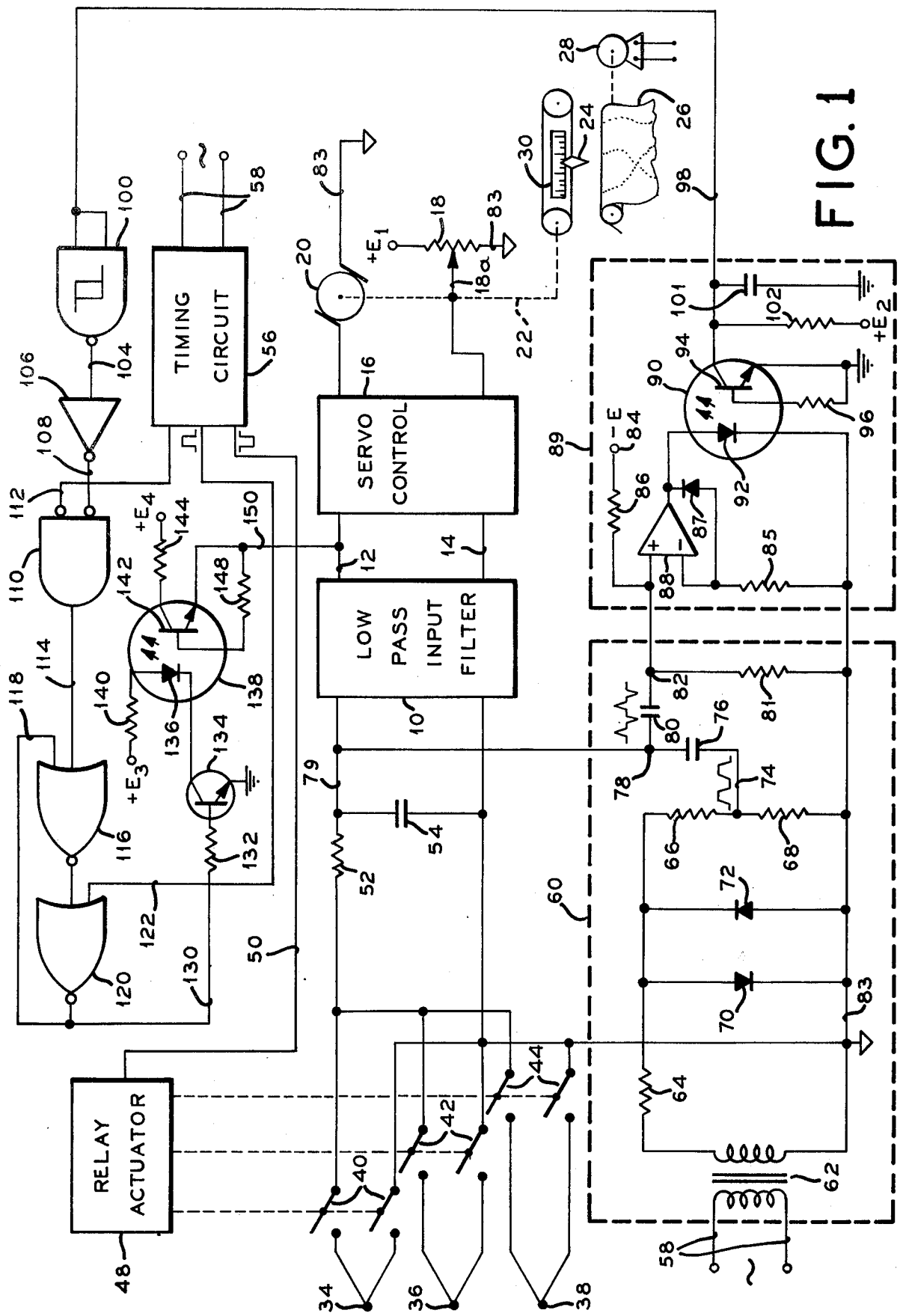
FIG. 1 is a circuit diagram partly in block form of the open circuit detector of this invention.

In FIG. 1 the multipoint recorder is made up of a low pass input filter 10 in the input circuit of the recorder. That low pass filter is connected by way of lines 12 and 14 to the servo control 16 which is operable to balance the measuring circuit of the recorder. The measuring circuit includes the potentiometer 18 supplied by voltage $+E_1$ and having a tap 18a which is movable by the balancing motor 20 which is connected to the output of the servo control and is operative therefore to rebalance the servo control 16. Upon rebalancing the servo control 16 the motor 20 is effective through the mechanical coupling 22 to position the recording head 24 across the chart 26 to record thereon the magnitude of each of the points being recorded by the recorder. The chart 26 is continuously moved by the chart motor 28 which is supplied from an a.c. source so that the chart record produced by the recorder indicates the magnitude of the servo inputs to the recorder with respect to time. Part of the recording head 24 also serves as a pointer to indicate on scale 30 the magnitude of the variable to be recorded.

The multipoint recorder as described above also includes means for sequentially connecting the inputs to the recorder as by the use of relays. For example, in FIG. 1 the inputs from the thermocouples 34, 36 and 38 are sequentially connected to the input circuit of the recorder and hence to the input filter 10 by way of the pairs of relay contacts 40, 42 and 44, respectively. Those pairs of contacts are actuated as shown from the relay actuator 48 by the mechanical couplings between the relay actuator 48 and the relay contacts themselves.

The relay actuator 48 is so arranged that it responds to trigger pulses from line 50 to sequentially connect a new point or a new thermocouple in this case to the recorder each time a trigger pulse is received. As shown in FIG. 1, the inputs to the recorder are connected to the low pass input filter 10 by way of the series resistor 52 to establish the minimum resistance for each input circuit and the shunt capacitor 54, which helps prevent high frequency noise which may enter the input circuit from triggering a response corresponding to that resulting from an open input.

During normal operation the timing circuit 56, which is supplied by an a.c. source over lines 58, is effective to generate periodically a negative pulse as a trigger signal on line 50. That pulse operates the relay actuator 48 so as to consecutively connect the thermocouples 34, 36 and 38 to the input circuit of the multipoint recorder, which includes the low pass input filter 10 as well as the servo control 16 and the associated elements of the measuring circuit as previously described as well as the resistor 52 and the capacitor 54. In order to make this multipoint recorder effective to identify when one of the thermocouples 34, 36 or 38 is open-circuited, and which one is open-circuited, it is necessary to add apparatus which includes the components set forth below.

One of the elements required for detecting an open circuit in the input of the multipoint recorder is a pluse generator such as the pulse generator 60 which is supplied from an a.c. source derived from lines 58 which corresponds with the a.c. source connected to timing circuit 56. In FIG. 1 the power supply or power source includes the transformer 62 and the series connected resistor 64 which connects across the voltage divider output consisting of resistors 66 and 68.

The transformer and the resistor 64 are also connected across a pair of oppositely poled diodes 70 and 72 forming a clipping circuit so that there is provided on line 74 a square wave of limited amplitude.

The output of the clipping circuit appearing on line 74 is connected by way of capacitor 76 to junction 78 which is connected to one side 79 of the input to the low pass input filter so that the pulse source 60 is effectively connected across the inputs as they are connected to the measuring circuit by their separate relay contacts 40, 42 and 44.

The clipped waveform supplied on line 74 is differentiated by the series connection between capacitor 76 and resistor 81 in conjunction with resistor 52 to which is added to the resistance of the thermocouple circuit connected to the input of the recorder so that there is thereby produced at junction 78 and hence at junction 82 by way of the d.c. blocking capacitor 80 a wave form consisting of a train of short pulses such as shown in FIG. 1. Thus, the source of the clipped a.c. power source is effective to produce a train of short pulses by virtue of the capacitor 76 and resistor 81 since the capacitor connects through resistance 81 to circuit common 83 so as to form part of the differentiating means.

When the input circuits are not open circuited, that is when the thermocouples 34, 36 and/or 38, whichever are connected to the input of the recorder, is not open, then resistor 52 and the input circuit resistance is also part of the differentiating circuit since it is essentially in parallel with resistor 81 and the peak value of the short pulses which appear at the junction 82, is of low magnitude since current flows through resistor 52 and the thermocouple connected at that time back to the circuit common connection 83. In other words, the output from pulse generator 60 at the terminal 82, which is the input to the pulse magnitude detecting circuit 89 is shunted by resistor 52 and a complete input circuit; whereas when the input circuit is open, the combination of resistor 52 and the input circuit does not shunt the input of circuit 89 and the magnitude of the short pulses appearing at terminal 82 is increased to a point above the threshold value established by the detecting circuit 89.

The pulse magnitude required at terminal 82 to cancel out the negative potential which would otherwise appear at terminal 82 as a result of the connection of the d.c. supply −E at terminal 84 is a potential just greater than that which is produced at 82 by current flow through the resistor 86 from the supply −E which normally maintains the terminal 82 at a negative potential in the absence of the train of short pulses previously referred to.

When the amplitude of the pulses in the pulse train exceed the negative potential normally appearing at terminal 82 then the amplifier 88 is effective to produce an output from the detecting circuit 89. That output results from the amplifier output current which flows through the diode 92 in the optical isolator 90 and is effective to cause the emmission of light which is detected by the transistor 94 of isolater 90 so as to make transistor 94 conductive. The amplifier 88 has its inverting input connected by way of resistor 85 to circuit common 83 and the inverting input is also connected by way of diode 87 to conduct current to the output terminal of amplifier 88. The combination of the diode 87 and the resistor 85 is effective to limit the negative output voltage of amplifier 88 so that it is not in excess of that amount which can be tolerated by the optical isolator 90. For example, this value may be something on the order of 0.6 volts. The output of detecting circuit 89 is supplied across resistor 102 as a result of current flow from a positive potential $+E_2$ through resistor 102 and transistor 94 so that whenever the optical isolator 90 is energized to make the output path conductive, the potential at the output of detector 89 on line 98 goes from the value $+E_2$ to ground potential. The output on line 98 is connected to ground through noise suppressing capacitor 101.

The Schmitt trigger input NAND gate 100 receives its inputs from line 98 and has its output supplied as an input on line 104 to the inverter 106 which serves to invert the polarity of the pulse formed and shaped by the NAND gate 100. The output of the inverter 106 then provides one of the inputs on line 108 to the NOR gate 110. The other input to the NOR gate 110 on line 112 is supplied by the timing circuit 56 in the form of a relatively long negative going pulse which forms a check window, that is, it establishes the time period during which the input circuits to the recorder can be checked by the check circuit. It will thus be evident that when the signal pulses appears on line 112 and 108 simultaneously, the NOR gate 110 produces an output on line 114 to the NOR gate 116. The other input to the NOR gate 116 is by way of line 118 which is derived from the output of the NOR gate 120. The NOR gate 120 is so connected as to have one of its inputs from NOR gate 116 output and its other input from a line 122 which supplies a positive going trigger pulse from timing circuit 56. The trigger pulse supplied on line 122 is timed to be in correspondence with the trigger pulse supplied on line 50 but is of opposite polarity and is therefore indicative that a different input is to be connected to and measured by the recorder as a result of the advancing of the sequential selection by the relay actuator 48.

The gates 116 and 120 in combination with the respective inputs and particularly including line 118 form a flip-flop which is effective to provide a high signal on line 130 whenever there is an open input circuit for the point being measured. That high signal is maintained until the next trigger pulse is generated on line 122 at which time the flip-flop is caused to reverse its condition and change the output on line 130 to a low signal until another open input circuit is detected by the coincident appearance of the negative going signal on line 112 indicating a check window coincident with a negative pulse on line 108 indicating that the open circuit has been detected by the check circuit as evidenced by the negative going input pulse to gate 100.

The appearance of a high signal on line 130 is effective through resistor 132 to make the transistor 134 conductive so as to provide a current flow through diode 136 of the optical isolator 138. The current supply for the diode 136 is from the source $+E_3$ through resistor 140. Whenever there is a current flow through the diode 136, the result is the transmission of the signal through the optical isolator by the transistor 142 becoming conductive so as to cause a current flow from the source $+E_4$ through resistor 144, the transistor 142, and the emitter circuit of that transistor, which includes the emitter to base resistor 148. Whenever the transistor 142 is conductive, a positive signal appears on line 150 and hence on line 12 as an input to the servo control 16. That positive potential is effective to drive the motor 20 so that the recording head 24 moves to the upscale limit of the recorder at which point it will print at the appropriate time an indicia indicating the number of the point which is associated with the input which is open circuited. Thus, the circuit of FIG. 1 is effective to print at the upscale edge of the chart 26 indicia indicating the number of the particular inputs being scanned which are open circuited.

It will be evident that upon the occurrence of a trigger pulse on line 122 indicating the selection of another point, the flip-flop will remove the positive potential from line 150 by virtue of its turning off the transistor 134 and the optical isolator 138.

In FIG. 2 there is shown wave forms for several of the signals in the circuit of FIG. 1. At the top of FIG. 2 is shown the negative going pulse of long duration which is identified as that signal which appears on line 112 from the timing circuit 56. That check window is preferably started as shown in FIG. 2 subsequent to the appearance of the trigger pulses on lines 122 and 50 which are effective to cause the relay actuator to advance to the next point and also to change the state of the flip-flop. The pulse on line 112 then ends at a point which precedes the occurrence of the next trigger pulse and may advantageously precede other activites required in the recording operation.

The pulse train generated on line 98 by the detection of an open circuit in an input to the recorder has a wave form such as that shown in the bottom of FIG. 2 for the check pulses. The pulse train on line 90 results from the amplitude of the pulse train appearing at terminal 82 exceeding the threshold value established by current through resistor 86 from potential source −E as previously explained. The wave form of the pulse train at terminal 82 is as shown in FIG. 2.

What is claimed is:

1. Apparatus for detecting an open input circuit in a multipoint recording system having a plurality of input circuits which are sequentially switched in a predetermined time phase relationship with an a.c. power source to sequentially connect said input circuits to a servo-operated measuring circuit through a low-pass input filter, comprising:

a pulse generator for generating a train of short pulses at the frequency of said power source including,
      means for connecting said generator to said a.c. power source so that said pulses are phased to occur only when one of said inputs is connected to said measuring circuit,
      a clipping circuit for providing limited amplitude square wave having the frequency of said power source, and
      means for differentiating said square wave to produce said short pulses;
   means connecting said pulse generator across said input circuits when said input circuits are connected to said measuring circuit so that the magnitude of the pulses generated at the output of said generator increases in response to an increased impedance across the generator output when the connected input circuit is open circuited; and
   a pulse magnitude detecting circuit connected to said pulse source, said detecting circuit being operative to produce an output signal when detecting said increase in said pulse magnitude indicative of an open circuit in the input circuit connected to the measuring system.

2. Apparatus as set forth in claim 1 which includes means responsive to an output signal from said pulse magnitude detecting circuit for producing an input to said servo-operated measuring system which will cause it to run to a limit so that when the recorder makes a record of the point identification it will be at a limit position on the medium on which the recording is done thus providing an identifiable record of the inputs which are open circuited.

3. Apparatus as set forth in claim 1 in which said means for connecting said pulse generator across said inputs includes a resistor in series with the connected input circuit for establishing a minimum impedance across said pulse generator output.

4. Apparatus as set forth in claim 1 in which said pulse magnitude detecting circuit includes an optical isolator to electrically isolate its output from its input.

* * * * *